United States Patent
Yu et al.

(10) Patent No.: US 10,900,225 B2
(45) Date of Patent: Jan. 26, 2021

(54) BAMBOO BUILDING CURTAIN WALL PLATE AND PREPARATION METHOD THEREOF

(71) Applicant: FUJIAN HEQIZU FORESTRY SCIENCE AND TECHNOLOGY CO., LTD., Fujian (CN)

(72) Inventors: Xianlu Yu, Fujian (CN); Zheng Wang, Fujian (CN); Yan Yu, Fujian (CN); Huanggui Wu, Fujian (CN); Weihong Xiao, Fujian (CN); Shanglu Lin, Fujian (CN)

(73) Assignee: Fujian Heqizu Forestry Science and Technology Co., Ltd., Fujian (CN)

( * ) Notice: Subject to any disclaimer, the term of this patent is extended or adjusted under 35 U.S.C. 154(b) by 0 days.

(21) Appl. No.: 16/516,876

(22) Filed: Jul. 19, 2019

(65) Prior Publication Data
US 2020/0208401 A1 Jul. 2, 2020

(30) Foreign Application Priority Data
Dec. 29, 2018 (CN) .......................... 2018 1 1635131

(51) Int. Cl.
| | |
|---|---|
| *B32B 3/06* | (2006.01) |
| *E04B 2/92* | (2006.01) |
| *B32B 9/02* | (2006.01) |
| *B32B 21/04* | (2006.01) |
| *B32B 21/14* | (2006.01) |
| *B32B 37/06* | (2006.01) |
| *B32B 37/10* | (2006.01) |

(52) U.S. Cl.
CPC ...................... *E04B 2/92* (2013.01); *B32B 9/02* (2013.01); *B32B 21/042* (2013.01); *B32B 21/14* (2013.01); *B32B 37/06* (2013.01); *B32B 37/10* (2013.01); *B32B 2250/05* (2013.01); *B32B 2250/40* (2013.01); *Y10T 428/24008* (2015.01)

(58) Field of Classification Search
CPC ..... Y10T 428/24008; Y10T 428/24017; E04B 2/92; E04B 2/88; B32B 9/02; B32B 21/14; B32B 3/06
See application file for complete search history.

(56) References Cited

U.S. PATENT DOCUMENTS 5,280,689 A * 1/1994 Mill .......................... E04B 2/92
52/309.9

* cited by examiner

*Primary Examiner* — Alexander S Thomas
(74) *Attorney, Agent, or Firm* — Avant Law Group

(57) ABSTRACT

Some embodiments of the disclosure provide a bamboo building curtain wall plate. According to an embodiment, the bamboo building curtain wall plate include a bamboo substrate, a metal connecting member, and a weather-resistant outer-decorative coating layer. The metal connecting member is disposed on the back surface of the bamboo substrate and connectable to the main body of a building. The weather-resistant outer-decorative coating layer is disposed on the front surface of the bamboo substrate. According to another embodiment, the bamboo substrate includes an outer layer which is a wood veneer or a bamboo material, and a core layer which is a bamboo material. According to a further embodiment, the bamboo substrate has a thickness of 8-15 mm.

6 Claims, 1 Drawing Sheet

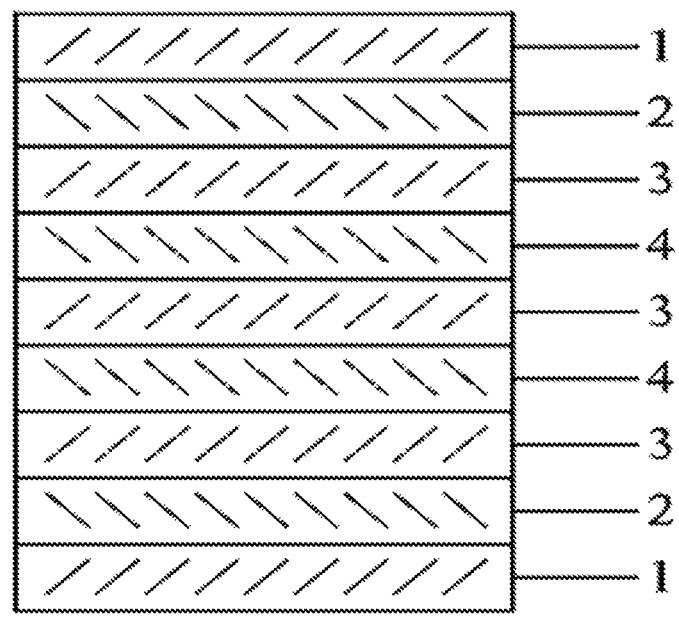

BAMBOO BUILDING CURTAIN WALL PLATE AND PREPARATION METHOD THEREOF

CROSS REFERENCE TO RELATED APPLICATIONS

This application claims priority to Chinese application number 20181163513-1.1, filed on Dec. 29, 2018, the disclosure of which is incorporated by reference herein in its entirety.

FIELD OF THE DISCLOSURE

The disclosure relates generally to the field of building curtain walls. More specifically, the disclosure relates to the field of a bamboo building curtain wall plate and a preparation method thereof.

BACKGROUND

A building curtain wall is an outer-wall enclosure of a building, which does not bear the load of the main structure of the building. The building curtain wall generally consists of decorative panels (of materials generally like glass, aluminum sheets, slate boards, and ceramic plates, etc.) and supporting structures (which are metal members of a substrate, and metal beams and columns connected to the main body of the building, etc.) behind the decorative panels.

The building curtain wall is generally connected with the main structure of the building by means of a bolt, a rocker arm, a spring mechanism and the like, which can generate a large relative displacement between the building curtain wall and the main structure of the building, such that the curtain wall will not be damaged even when the main structure shift laterally up to $1/60$.

In recent years, with the continuous advancement in manufacturing technologies of the building curtain wall, the material and structure of the building curtain wall have developed from bulky to lighter. For example, a new material (including a biomass material) or a thin material is used to replace a bulky natural stone material, and the like. However, there are still less types of light curtain wall plates and thin curtain wall plates in the prior art, and it is an urgent need to conduct further development.

SUMMARY

The following presents a simplified summary of the invention in order to provide a basic understanding of some aspects of the invention. This summary is not an extensive overview of the invention. It is not intended to identify critical elements or to delineate the scope of the invention. Its sole purpose is to present some concepts of the invention in a simplified form as a prelude to the more detailed description that is presented elsewhere.

According to an embodiment, the disclosure provides a bamboo building curtain wall plate and a preparation method thereof. In the disclosure, bamboo is used as a main raw material for production.

According to another embodiment, the disclosure provides a bamboo building curtain wall plate including a bamboo substrate, a metal connecting member disposed on a back surface of the bamboo substrate and, connectable to the main body of a building, and a weather-resistant outer-decorative coating layer disposed on a front surface of the bamboo substrate. The bamboo substrate includes an outer layer which is a wood veneer or a bamboo material, and a core layer which is a bamboo material. The bamboo substrate has a thickness of 8-15 mm. Optionally, the weather-resistant outer-decorative coating layer has a thickness of 1-10 mm. Optionally, the weather-resistant outer-decorative coating layer is a fluorocarbon paint layer, an acrylic paint layer, a polyurethane paint layer, a real stone paint layer, a multicolor stoneface paint layer, an imitation stone paint layer, an acrylic exterior-wall coating layer, or a relief coating layer. Optionally, the metal connecting member includes a decorative overt rivet, a cutting screw, and a metal hook fixed by a back bolt.

According to a further embodiment, the disclosure provides a method for preparing a bamboo building curtain wall plate, including the following steps. (1) Subjecting a core-layer unit and an outer-layer unit to an impregnation process in an impregnation solution to obtain an impregnated core-layer unit and an immersed outer-layer unit. The core-layer unit is a bamboo material unit, the outer-layer unit is a bamboo material unit or a wood veneer unit, and the bamboo material unit includes a radial or chordwise bamboo-split curtain unit or a flattened bamboo unit. (2) Assembling the impregnated core-layer unit and the impregnated outer-layer unit along a direction orthogonal to the fiber texture. (3) Hot-pressing a preform body obtained from the assembling to obtain a bamboo substrate. (4) Coating a weather-resistant outer-decorative coating layer on the front surface of the bamboo substrate. (5) Disposing a connecting member on the back surface of the bamboo substrate to obtain the bamboo building curtain wall plate.

In one embodiment, the impregnation solution in step (1) is a mixed solution of a weather-resistant adhesive and a preservative, and the total mass concentration of the weather-resistant adhesive and the preservative in the mixed solution is 30-40%. The mass ratio of the weather-resistant adhesive to the preservative is (5-8):(2-5). The time of the impregnation process is 10-20 min.

In some embodiments, the weather-resistant adhesive in step (1) is one or more of a phenolic resin adhesive, a resorcinol/formaldehyde adhesive, and an isocyanate adhesive, and the preservative is one or more of a boron-based preservative and a fluorine-based preservative.

In other embodiments, the thickness of the bamboo material unit in step (1) is 1-2.5 mm, and the wood veneer unit is a poplar veneer, a eucalyptus veneer, or a pine veneer. The wood veneer unit has a thickness of 1.2-2.5 mm.

In further embodiments, the method further includes drying the impregnated core-layer unit and the impregnated outer-layer unit before the assembling. The drying temperature is 70-90° C. and the drying time is 20-30 min. The hot-pressing pressure is 0.8-1.2 MPa and the hot-pressing temperature is 140-160° C.

According to one embodiment, the disclosure provides a bamboo building curtain wall plate including a bamboo substrate, a metal connecting member disposed on the back surface of the bamboo substrate and is connectable to the main body of a building, and a weather-resistant outer-decorative coating layer disposed on the front surface of the bamboo substrate. The bamboo substrate includes an outer layer which is a wood veneer or a bamboo material, and a core layer which is a bamboo material. The bamboo substrate has a thickness of 8-15 mm. In the disclosure, bamboo is used as a main raw material for production, and the obtained bamboo building curtain wall plate has advantages such as being light-weight, renewable, low in carbon emission, environmentally-friendly, and cost-effective. It can be seen from the results of the embodiments that, the index of the bamboo building curtain wall plate provided by the disclosure meets the provisions about the weather-resistance performance index of the curtain wall plate in the standard "JG/T260-2009 high-pressure laminates-sheets based on thermosetting resins for curtain wall", and has a strength performance which can meet the index requirements for a wood load-bearing enclosure sheet in a building structure.

According to an embodiment, the disclosure provides a method for preparing the bamboo building curtain wall plate, including the following steps. (1) Subjecting a core-layer unit and an outer-layer unit to an impregnation process in an impregnation solution to obtain an impregnated core-layer unit and an immersed outer-layer unit. The core-layer unit is a bamboo material unit, the outer-layer unit is a bamboo material unit or a wood veneer unit, and the bamboo material unit includes a radial or chordwise bamboo-split curtain unit or a flattened bamboo unit. (2) Assembling the impregnated core-layer unit and the impregnated outer-layer unit along a direction orthogonal to the fiber texture. (3) Hot-pressing a preform body obtained from the assembling to obtain a bamboo substrate. (4) Coating a weather-resistant outer-decorative coating layer on the front surface of the bamboo substrate. (5) Disposing a connecting member on the back surface of the bamboo substrate to obtain the bamboo building curtain wall plate.

BRIEF DESCRIPTION OF THE DRAWING

The FIGURE shows a schematic structural diagram of a bamboo substrate of a bamboo building curtain wall plate.

DETAILED DESCRIPTION

Some embodiments of the discourse a bamboo substrate of a bamboo building curtain wall plate whose schematic structural diagram is shown in the FIGURE. In the schematic structural diagram, 1 represents longitudinal wood veneer, 2 represents transverse wood veneer, 3 represents longitudinal bamboo curtain, and 4 represents transverse bamboo curtain.

Further embodiments of the disclosure provide a bamboo building curtain wall plate including a bamboo substrate, a metal connecting member disposed on the back surface of the bamboo substrate and connectable to the main body of a building, and a weather-resistant outer-decorative coating layer disposed on the front surface of the bamboo substrate. The bamboo substrate includes an outer layer which is a wood veneer or a bamboo material, and a core layer which is a bamboo material. The bamboo substrate has a thickness of 8-15 mm. The bamboo building curtain wall plate provided by the disclosure includes a bamboo substrate, which has a thickness of 8-15 mm, and preferably 10-12 mm. In the disclosure, the thickness of the bamboo substrate may be set according to actual needs.

The bamboo building curtain wall plate includes a metal connecting member disposed on the back surface of the bamboo substrate and connectable to the main body of a building. The metal connecting member may be a rivet, a screw or a hook. The rivet may be a decorative overt rivet, the screw may be a cutting screw, and the hook may be a metal hook. The bamboo building curtain wall plate further includes a weather-resistant outer-decorative coating layer disposed on the front surface of the bamboo substrate, which has a thickness of 1-10 mm, and preferably 2-5 mm. The thickness of the weather-resistant outer-decorative coating layer may be adjusted according to the material of the coating layer and the coating process. The weather-resistant outer-decorative coating layer may be a fluorocarbon paint layer, an acrylic paint layer, a polyurethane paint layer, a real stone paint layer, a multicolor stoneface paint layer, an imitation stone paint layer, an acrylic exterior-wall coating layer, or a relief coating layer.

The disclosure further provides a method for preparing the bamboo building curtain wall plate, including the following steps. (1) Subjecting a core-layer unit and an outer-layer unit to an impregnation process in an impregnation solution to obtain an impregnated core-layer unit and an immersed outer-layer unit. The core-layer unit is a bamboo material unit, the outer-layer unit is a bamboo material unit or a wood veneer unit, and the bamboo material unit includes a radial or chordwise bamboo-split curtain unit or a flattened bamboo unit. (2) Assembling the impregnated core-layer unit and the impregnated outer-layer unit along a direction orthogonal to the fiber texture. (3) Hot-pressing a preform body obtained from the assembling to obtain a bamboo substrate. (4) Coating a weather-resistant outer-decorative coating layer on the front surface of the bamboo substrate. (5) Disposing a connecting member on the back surface of the bamboo substrate to obtain the bamboo building curtain wall plate.

Optionally, the core-layer unit and the outer-layer unit are subjected to the impregnation process in the impregnation solution to obtain the impregnated core-layer unit and the immersed outer-layer unit. The core-layer unit is a bamboo material unit, the outer-layer unit is a bamboo material unit or a wood veneer unit, and the bamboo material unit includes a radial or chordwise bamboo-split curtain unit or a flattened bamboo unit. The core-layer unit and the outer-layer unit may be subjected to the impregnation process individually or together. The impregnation solution in step (1) may be a mixed solution of a weather-resistant adhesive and a preservative, and the total mass concentration of the weather-resistant adhesive and the preservative in the mixed solution may be 30-40%, and preferably 35-38%, the mass ratio of the weather-resistant adhesive to the preservative may be (5-8):(2-5), and particularly 5:5 or 8:2, and the time of the impregnation process may be 10-20 min, and preferably 15-18 min. During the impregnation process, there is no particular requirement on the dose of the impregnation solution, as long as the core-layer unit and the outer-layer unit may be immersed in the impregnation solution. The weather-resistant adhesive in step (1) may be one or more of a phenolic resin adhesive, a resorcinol/formaldehyde adhesive, and an isocyanate adhesive. The preservative may be one or more of a boron-based preservative and a fluorine-based preservative.

Optionally, the bamboo-split curtain unit in the step (1) is a bamboo curtain woven with bamboo splits. The bamboo curtain may be a radial curtain or a chordwise curtain. The thickness of the bamboo material unit may be 1-2.5 mm, and preferably 1-1.2 mm.

Optionally, the wood veneer unit of step (1) may be a coniferous wood board or a broadleaf wood board, and preferably a poplar veneer, a eucalyptus veneer, or a pine veneer. The wood veneer unit may have a thickness of 1.2-2.5 mm, and preferably 1.2-1.7 mm. The moisture content of the bamboo-split curtain unit, the flattened bamboo unit, and the wood veneer unit of the disclosure may be 6-8%, and preferably 7%. The bamboo-split curtain unit, the flattened bamboo unit, and the wood veneer unit of such a moisture content may ensure the optimal state of gum dipping and hot-pressing. The thickness setting of the bamboo-split curtain unit, the flattened bamboo unit, and the wood veneer unit may increase the number of sizing layers and improve the dimensional stability of the sheets.

Optionally, the impregnated core-layer unit and the impregnated outer-layer unit are dried before the assembling. The drying temperature may be 70-90° C. (preferably 80-85° C.), and the drying time may be 20-30 min (preferably 25-28 min). The impregnated core-layer unit and the impregnated outer-layer unit are assembled along a direction orthogonal to the fiber texture. The two outer layers of the preform body obtained from the assembling independently includes at least one impregnated outer-layer unit, and may independently includes 1 or 2 impregnated outer-layer units. The core layer of the preform body independently includes at least one impregnated core-layer unit, and may include 6-7 impregnated core-layer units.

Optionally, two adjacent ones of the impregnated units in the preformed body are superposed orthogonally. The units are disposed as being orthogonally superimposed to ensure the uniformity of the mechanical properties of the bamboo building curtain wall plate, so that the mechanical properties are substantially consistent in both vertical and horizontal directions. The layer numbers of the impregnated core-layer units and the impregnated outer-layer units may be adjusted according to the thickness of the final product and the thicknesses of respective units.

Optionally, the preform body obtained from the assembling is hot-pressed to obtain a bamboo substrate. The hot-pressing pressure (the pressure on the surface of the plate) may be 0.8-1.2 MPa (preferably 1.0 MPa), the hot-pressing temperature may be 140-160° C. (preferably 150-155° C.), and the hot-pressing time may be set according to the thickness of the finished product of bamboo building curtain wall plate. The hot-pressing time may be controlled based on 1-1.5 min/mm, and preferably 1.2-1.3 min/mm. The ratio of the thickness after the hot pressing to the thickness before the hot-pressing may be 1:(1.1-1.3). The hot-pressing may be carried out in a cold-up-and-cold-down or hot-up-and-hot-down manner.

Optionally, the hot-pressed product is subjected to a sanding process after the hot pressing is completed. Thus, if the hot-pressed product is relatively large, it can be trimmed down according to technical requirements, and further edge-sealed. The edge sealing of the disclosure a sealing on four sides of a sheet with a putty to prevent water or moisture from entering the interior of the substrate.

Optionally, the weather-resistant outer-decorative coating layer is coated on the front surface of the bamboo substrate, and the setting method may be brush coating, roller coating, spray coating, or 3D printing.

Optionally, the connecting member is disposed on the back surface of the bamboo substrate to obtain the bamboo building curtain wall plate.

The following describes multiple exemplary embodiments of the disclosure. The described exemplary embodiments are merely a part rather than all of the embodiments of the disclosure. All other embodiments obtained by a person of ordinary skill in the art based on the embodiments of the present invention without creative efforts shall fall within the protection scope of the present invention.

Embodiment 1

A bamboo material was subjected to processes such as breaking bamboo, bamboo splitting, and curtain weaving, so as to prepare a radial bamboo-split curtain. The thicknesses of the bamboo splits could not be held completely consistent, and thus the resultant bamboo-split curtain had a thickness of 1.0-1.2 mm. The bamboo-split curtain was placed into a drying kiln for drying treatment, so that the moisture content of the bamboo-split curtain was 6-8%. At the same time, a poplar veneer having a thickness of 1.2-1.5 mm is also dried to have a moisture content of 6-8%. Gum dipping of the bamboo-split curtain and the wood veneer: the bamboo-split curtain and poplar veneer of the previous step were placed into a gum pool containing a mixed solution of phenolic aldehyde and boric acid preservatives. The mass concentration of the mixed solution was 30%. The bamboo-split curtain and the wood veneer were removed after dipped for 10 min, and then the gum solution was drained off from the bamboo-split curtain and the wood veneer. After the draining off of the gum, the bamboo-split curtain and the wood veneer were placed into a mesh-belt dryer for drying. The drying temperature was 70° C., and the drying time was 30 min. After drying, the gum-dipped bamboo-split curtain and wood veneer were assembled in an orthogonal superimposing manner to form a slab. The outermost two layers of the slab were wood veneers which had subjected to the orthogonal assembling, and the core layer was 6 layers of bamboo-split curtains which had subjected to the orthogonal assembling. The slab was pushed into a thermocompressor for pressing it into a plate. The hot-pressing pressure was 1.0 MPa, the hot-pressing temperature was 140° C., the hot-pressing time was set as 1 minute per mm of the thickness of the finished plate, and the compression ratio of the finished plate to the slab was 1:1.1. The hot pressing process was carried out in a cold-up and-cold-down manner. The surface of the pressed substrate was subjected to a sanding process to facilitate the painting and decorating of the surface. The sanded substrate sheet was trimmed to a specified size as required. The trimmed sheet was sealed with a weather-resistant putty at four sides thereof to prevent water or moisture from entering the interior of the substrate, such that a bamboo substrate was obtained. The bamboo substrate was coated with a fluorocarbon paint having a weather-resistant function in a spray coating manner, and then dried at room temperature. A decorative overt rivet was used as a connector to be disposed on a surface of the bamboo substrate, so as to obtain a bamboo building curtain wall plate.

Embodiment 2

The solutions were carried out in accordance with Embodiment 1, except that the layer number of the outer-layer poplar veneer was changed from two to one.

Embodiment 3

The solutions were carried out in accordance with Embodiment 1, except that the poplar veneer in the outer layer was replaced with the pine veneer.

Embodiment 4

The solutions were carried out in accordance with Embodiment 1, except that the temperature of the hot-pressing process was changed to 160° C., and the hot-pressing was conducted in a hot-up-and-hot-down manner.

Embodiment 5

The solutions were carried out in accordance with Embodiment 1, except that the phenolic resin adhesive was replaced with the resorcinol/formaldehyde adhesive.

Embodiment 6

The solutions were carried out in accordance with Embodiment 1, except that the bamboo-split curtain was replaced with a flattened bamboo curtain.

In various embodiments, bamboo may be used as a main raw material for the production and the preparation of a building curtain wall plate. In other embodiments, the production and the preparation of a building curtain wall plate may utilize easily-available materials and may be easy to implement. In further embodiments, the index of the bamboo building curtain wall plate of the disclosure meets the provisions about the weather-resistance performance index of the curtain wall plate in the standard "JG/T260-2009 high-pressure laminates-sheets based on thermosetting resins for curtain wall," and may have a strength performance which can meet the index requirements for a wood load-bearing enclosure sheet in a building structure. The disclosure further provides a method for preparing the bamboo building curtain wall plate, which may be simple in operation, low in energy consumption for production, and suitable for expanded production.

Various embodiments of the bamboo building curtain wall plates in the disclosure may have one or more of the following effects: light-weight, renewable, low in carbon emission, environmentally-friendly, low in production energy consumption, and cost-effective.

The foregoing descriptions are some exemplary implementation manners of the disclosure. It should be noted that for a person of ordinary skill in the art, several improvements and modifications may further be made without departing from the principle of the present invention. These improvements and modifications should also be deemed as falling within the protection scope of the present invention Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Unless indicated otherwise, not all steps listed in the various figures need be carried out in the specific order described.

The disclosure claimed is:

1. A method for preparing a bamboo building curtain wall plate, comprising the steps of:
   (1) subjecting a core-layer unit and an outer-layer unit to an impregnation process in an impregnation solution to obtain an impregnated core-layer unit and an immersed outer-layer unit;
   (2) assembling the impregnated core-layer unit and the impregnated outer-layer unit along a direction orthogonal to a fiber texture;
   (3) hot-pressing a preform body obtained from the assembling to obtain a bamboo substrate;
   (4) coating a weather-resistant outer-decorative coating layer on the front surface of the bamboo substrate; and
   (5) disposing a connecting member on the back surface of the bamboo substrate to obtain the bamboo building curtain wall plate;
   wherein:
   the core-layer unit is a bamboo material unit;
   the outer-layer unit is a bamboo material unit or a wood veneer unit; and
   the bamboo material unit includes a radial or chordwise bamboo-split curtain unit or a flattened bamboo unit.

2. The preparation method according to claim 1, wherein:
   the impregnation solution in step (1) is a mixed solution of a weather-resistant adhesive and a preservative;
   a total mass concentration of the weather-resistant adhesive and the preservative in the mixed solution is 30-40%;
   a mass ratio of the weather-resistant adhesive to the preservative is (5-8):(2-5); and
   a time of the impregnation process is 10-20 min.

3. The preparation method according to claim 2, wherein:
   the weather-resistant adhesive comprises at least one item selected from the group consisting of a phenolic resin adhesive, a resorcinol/formaldehyde adhesive, and an isocyanate adhesive; and
   the preservative comprises at least one item selected from the group consisting of a boron-based preservative and a fluorine-based preservative.

4. The preparation method according to claim 1, wherein:
   the bamboo material unit has a thickness of 1-2.5 mm;
   the wood veneer unit is a poplar veneer, a *eucalyptus* veneer, or a pine veneer; and
   the wood veneer unit has a thickness of 1.2-2.5 mm.

5. The preparation method according to claim 1, further comprising:
   drying the impregnated core-layer unit and the impregnated outer-layer unit before the assembling;
   wherein a drying temperature is 70-90° C. and a drying time is 20-30 min.

6. The preparation method according to claim 1, wherein:
   a hot-pressing pressure is 0.8-1.2 MPa; and
   a hot-pressing temperature is 140-160° C.

* * * * *